(12) United States Patent  
Bentley et al.

(10) Patent No.: US 9,094,572 B2
(45) Date of Patent: Jul. 28, 2015

(54) SYSTEMS AND METHODS TO DUPLICATE AUDIO AND VISUAL VIEWS IN A CONFERENCING SYSTEM

(71) Applicant: Avaya Inc., Basking Ridge, NJ (US)

(72) Inventors: Jon Louis Bentley, New Providence, NJ (US); Parameshwaran Krishnan, Basking Ridge, NJ (US); Peter Tarle, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 106 days.

(21) Appl. No.: 13/786,780

(22) Filed: Mar. 6, 2013

(65) Prior Publication Data

US 2014/0253671 A1    Sep. 11, 2014

(51) Int. Cl.
*H04N 7/14*    (2006.01)
*H04N 7/15*    (2006.01)
*H04L 29/06*    (2006.01)
*H04M 3/56*    (2006.01)

(52) U.S. Cl.
CPC .............. *H04N 7/15* (2013.01); *H04L 65/1069* (2013.01); *H04L 65/4038* (2013.01); *H04M 3/567* (2013.01)

(58) Field of Classification Search
CPC ......... H04N 7/15; H04N 7/147; H04N 7/152; H04N 7/141; H04N 7/14
USPC ............. 348/14.01, 14.08, 14.09; 379/202.01
See application file for complete search history.

(56) References Cited

U.S. PATENT DOCUMENTS

| | | | |
|---|---|---|---|
| 7,533,146 B1 * | 5/2009 | Kumar | 709/205 |
| 7,603,411 B1 | 10/2009 | Davies et al. | |
| 7,679,637 B1 | 3/2010 | Kohler | |
| 7,945,622 B1 | 5/2011 | Pegg | |
| 2003/0220973 A1 | 11/2003 | Zhu et al. | |
| 2004/0010599 A1 * | 1/2004 | Otobe | 709/228 |
| 2009/0300520 A1 | 12/2009 | Ashutosh et al. | |
| 2009/0307189 A1 | 12/2009 | Bobbitt et al. | |
| 2009/0327425 A1 | 12/2009 | Gudipaty | |
| 2011/0154204 A1 * | 6/2011 | Narayanaswamy | 715/727 |
| 2011/0271209 A1 | 11/2011 | Jones et al. | |
| 2012/0144320 A1 | 6/2012 | Mishra et al. | |
| 2012/0163576 A1 * | 6/2012 | Bentley et al. | 379/202.01 |
| 2013/0194378 A1 * | 8/2013 | Brown | 348/14.09 |
| 2013/0339431 A1 | 12/2013 | Yannakopoulos et al. | |

OTHER PUBLICATIONS

Combined Search and Examination Report—GB 1310987.1 dated Nov. 28, 2013, 9 pages.

* cited by examiner

*Primary Examiner* — Quoc D Tran
(74) *Attorney, Agent, or Firm* — Maldjian Law Group LLC; John Maldjian; William J. Connelly, III

(57) ABSTRACT

A conferencing system includes an authentication module for establishing a communication session. The communication session includes a communication interface to a plurality of participants. The conferencing system further includes a selection module for letting a participant select a leader among the plurality of participants. The conferencing system further includes a duplication module configured to provide audio and visual views of the communication session to the participant based upon audio and visual views of the communication session associated with the leader. The conferencing system further includes a recording module for storing a history of actions made by the leader in the conferencing system and letting the participant view the history of actions made by the leader and reach a present state of audio and visual views of the communication session associated with the leader.

20 Claims, 6 Drawing Sheets

SYSTEMS AND METHODS TO DUPLICATE AUDIO AND VISUAL VIEWS IN A CONFERENCING SYSTEM

BACKGROUND

1. Field of the Invention

Embodiments of the present invention generally relates to the field of multimedia communication. More particularly, embodiments of the present invention relates to a mechanism of synchronizing audio and visual views of an electronic device with other electronic devices.

2. Description of Related Art

Since the time when computers were invented, there has been a rapid and continual development in computers and related technology. Further, ability of the computers to connect with networks to establish communication with one or more remotely located computers has opened a gate to endless possibilities in communication system. One very commonly used means for communication via computers is chatting, where one or more users can interchange text messages with each other. Chatting software typically does not allow users to share pre-stored graphics (such as smiley) or graphics files (such as images) with each other.

Further, the growth in the technology domain of network, computers, and telecommunication enabled the computer users to use audio/video means to communicate with one or more Internet enabled computers. This helped in emerging of e-conferences over tele-conferences as the e-conferences are more user-friendly and cost effective over tele-conferences. E-conferences enable the users with Internet enabled computing machines to communicate via audio/video means to other users. Further, e-conferences may include conferences in which users are connected to share a presentation, to discuss over an agenda, to play video games, to watch education sessions and more.

Conventional systems and methods related to e-conference allow the participants of the e-conferences to view the screen of a presenter only. However, the conventional systems and methods related to e-conference do not allow the participants of e-conferences to view or follow the screen of a fellow participant at another location. Hence, if some fellow participants have difficulty in understanding some context or topic in the conference, then they have difficulty in following rest of the conference as well, leaving them excluded from meaningful participation.

Further, the conventional systems and methods related to e-conference do not allow the participants to join as a group. This limits the educational possibilities in the e-conferencing systems as every participant is dependent on his/her skills to understand the agenda of the e-conference and there is no group leader to explain matter during the presentation without interrupting or disturbing the speaker/presenter.

Therefore, there is a need for a system that may enable the group members to experience the e-conference from the perspective of the group leader and further enable a group of participants to join an e-conference as a group entity with a group leader.

SUMMARY

Embodiments in accordance with the present invention provide a conferencing system. The conferencing system includes an authentication module for establishing a communication session, wherein the communication session has a plurality of participants. The conferencing system further includes a selection module for letting a participant select a leader among the plurality of participants. Leadership functions may be divided among more than one leader, e.g., a session leader may lead actions that take place during the conference, and a view leader may lead a view of how the actions are viewed by other participants. A view leader may further include a primary view leader and one or more secondary view leaders. Secondary view leaders provide selectable alternate points of view during playback. The conferencing system further includes a duplication module for providing audio and visual views of the communication session to the one or more participants based upon audio and visual views of the communication session associated with another participant. The other participant may be the session leader, or a selected view leader.

Embodiments in accordance with the present invention further provide a computer-implemented method for sharing audio and visual views in a communication session. The computer-implemented method includes establishing a communication session, the communication session having a plurality of participants. The computer-implemented method further includes enabling one or more participants to select a leader among the plurality of participants. The computer-implemented method further includes providing audio and visual views of the communication session to the participant based upon audio and visual views of the communication session associated with the leader.

Embodiments in accordance with the present invention further provide a computer readable medium, storing computer readable instructions, when executed by a processor to perform a method. The method includes establishing a communication session, the communication session having a plurality of participants. The method further includes enabling a participant to select a leader among the plurality of participants. The method further includes providing audio and visual views of the communication session to the participant based upon audio and visual views of the communication session associated with the leader.

The present invention can provide a number of advantages depending on the particular configuration. First, the present invention provides an e-conference system that provides synchronization of audio and visual display of a communication session, by associating a participant with one or more other participants. Further, the present invention enables the e-conferences to be more user-friendly and educational. Furthermore, the present invention enables the participants of the e-conferences to communicate with each other in convenient manner without disturbing the actual presenter or speaker of the e-conferences. Again further, the present invention provides freedom to the participants to select their display contents according to their own wishes.

Further, the present invention advantageously enables a participant to broadcast his/her machine's displayed data to selected participants. Furthermore, the present invention provides freedom to the broadcaster to select what data or how much portion of the display screen he/she is willing to broadcast. In addition, the present invention enables the participants to view past events that were displayed on the display screens of other participants of e-conferences. Past events may be selected according to the virtual time at which the events occurred, or by restoring a previously saved state of the e-conference, or by other suitable methods. Participants may also conduct a chat or side-bar conversation to address important issues during a conference with each other. This enables the participants to share their perspectives with each other. In an embodiment, any participant can view the e-conference from the perspective of any other participant, so long as that other person grants permission.

Further, the present invention provides a conferencing system that directly does the duplication. More particularly, the existing web/virtual conferencing system sends the appropriate audio/screen to an individual participant subscribing to a leader's (e.g., user X) view. Hence, the conferencing system provided by the present invention is more bandwidth friendly. Additionally, the leader sharing his/her desktop can work on other items, such as by occluding his/her conferencing screen, without impacting other participants that are duplicating the view.

These and other advantages will be apparent from the disclosure of the present invention contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated that those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein.

Figure 1A:
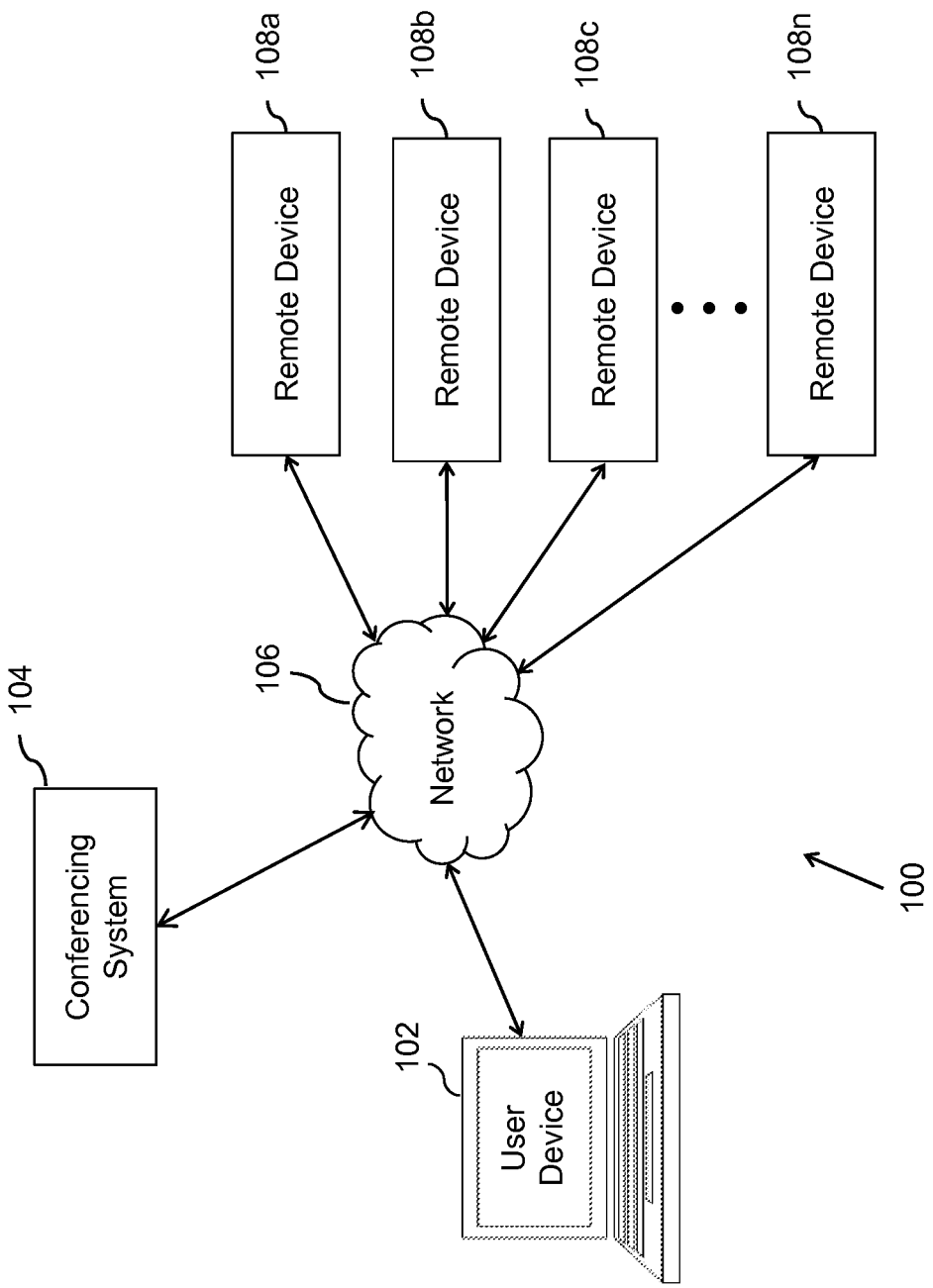
FIG. 1A is an exemplary network environment that supports communication between various devices, such as electronic device and a conferencing system, in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system, e.g., conferencing system. However, the present invention is not limited to any particular type of communication system switch or configuration of system elements. Those skilled in the art will recognize the disclosed techniques may be used in any communication application in which it is desirable to provide improved sharing of views.

FIG. 1A illustrates an exemplary network environment 100 to support communication between various devices, such as, electronic device 102 and a conferencing system 104, in accordance with an embodiment of the present invention. Further, the environment 100 includes the electronic device 102 of a user that is connected to the conferencing system 104 via the network 106. Similarly, the remote devices 108a-n are connected with the conferencing system 104 via the network 106. The Network 106 may include, but is not restricted to, a communication network such as Internet, Intranet, PSTN, Local Area Network (LAN), Wide Area Network (WAN), Metropolitan Area Network (MAN), and so forth.

In an embodiment, the conferencing system 104 may be implemented as a web server. Further, the user of the electronic device 102 may need to register with the conferencing system 104 in order to get login credentials for authentication. Registration is ordinarily a one-time process. Examples of the electronic devices and remote devices may include, but are not restricted to, a personal computer, a mobile phone, a smart-phone, a personal digital assistant (PDA), a tablet computer, a laptop, and the like.

Thereafter, the user/participant may use the login credentials to authenticate him/her as a valid user to have access to an e-conference that is supported by the conferencing system 104. The e-conference may correspond to any communication between two or more users over Internet or Intranet. Further, the e-conference may support exchange of textual, audio, video, graphical and other multimedia data.

Similarly, the remote devices 108a-n may also need to first register with the conferencing system 104 in order to get login credentials and may then have access to propose new or join existing e-conferences. In an embodiment, a secondary authentication might be required to join any existing/on-going e-conference. The credentials for the secondary authentication might be distributed by the creator of the e-conference to selected users.

Further, the conferencing system 104 may enable the user of the device 102 or the users of the remote devices 108a-n to form a new group or join an existing group as a group member or as a group leader. In an embodiment, the group members may be passive members of the e-conference and the group leader may be an active member of the e-conference. Further, the group members and group leaders may or may not be present at same geographical location.

Furthermore, the conferencing system 104 may enable the group leader to share portions or all of his/her display screen content with the group members. In an embodiment, the group members may also have access to the audio data that is being received and/or transmitted by the group leader. In addition, the conferencing system 104 may enable the group leader to provide additional data corresponding to the e-conference (such as PPT presentation, video conference, video game, etc.) for the group members. The additional data includes data manually provided by the group leader to its group members, and data stored by the conferencing system 104 in an archive corresponding to the display content of the group leader's device, e.g., a history of selections and/or actions in a conferencing system by the group leader. Actions may include keystrokes, mouse movements, mouse clicks, voice communication uttered or listened to, other audible signals generated or listened to, video watched or generated, and so forth.

For example, suppose that users A, B, C, D and E are logged in as members of a business presentation, where user A may be a presenter, user B may be a senior employee of an organization and users C, D, and E may be trainees/spectators of the organization having no knowledge of the technology domain of the presentation. In this case, the trainees C, D, and E may easily lose track on the topics discussed between the senior employee B and the presenter A. Therefore, the users C, D, and E may duplicate user B's screen view with a click of a button. The conferencing system 104 may then facilitate synchronization of the screen content between the group members. User B may then automatically become a group leader for his followers. This may allow the users C, D, and E to see the presentation precisely from B's point of view, as the users C, D, and E will then be able to view all the activities of user B, such as, noting down important points, opening related files or graphs, searching over Internet for related matter, etc. In a virtual environment, this can simulate users C, D, and E moving to B's location and watching live display screen of user B. Moreover, if one of the users C, D, and E sends chat messages to user B to query on the presentation, then the other group members may also be able to see the question and the answer provided by the user B. This may help the trainees to better understand the presentation than if they were to try to learn it by themselves without such assistance from other group members. In addition, if at any part of the presentation, the trainees want to go back to any point of presentation to check how a result was conceived, then the trainees can simply browse through history of screenshots stored from the display screen of the group leader. In some embodiments, the group leader may select screenshots to store, e.g., at junctures in a conference, or to illustrate important points, or to illustrate states of the econference before and after an action, and so forth. The trainee may select from among available saved screenshots by invoking a control, menu selection, or the like in order to view a list of available screenshots and/or select from among available screenshots.

In an additional embodiment, a group leader sharing his/her desktop can work on other items (perhaps occluding his/her conferencing screen) without impacting group members that are duplicating the view. For example, if X and Y are two users of an e-conference, then in an embodiment, user X may stay in sync with user Y, continuing to see exactly what Y sees. In another embodiment, X starts in sync with Y, but can then modify his/her view to his/her own tastes (perhaps to return later either to X's original state, the state in which he joined Y, or Y's current state).

Further, in virtual world, a group of people (i.e., participants) attached to a group leader might be symbolized by a group of characters behind the group leader. The participants should see the virtual world through the perspective of group leader. However, it is ordinarily not helpful for one non-group-leader participant to see the virtual world through the perspective of another non-group-leader participant. Alternatively, the group leader could be represented by a character that signifies the representation of many people.

Figure 1B:
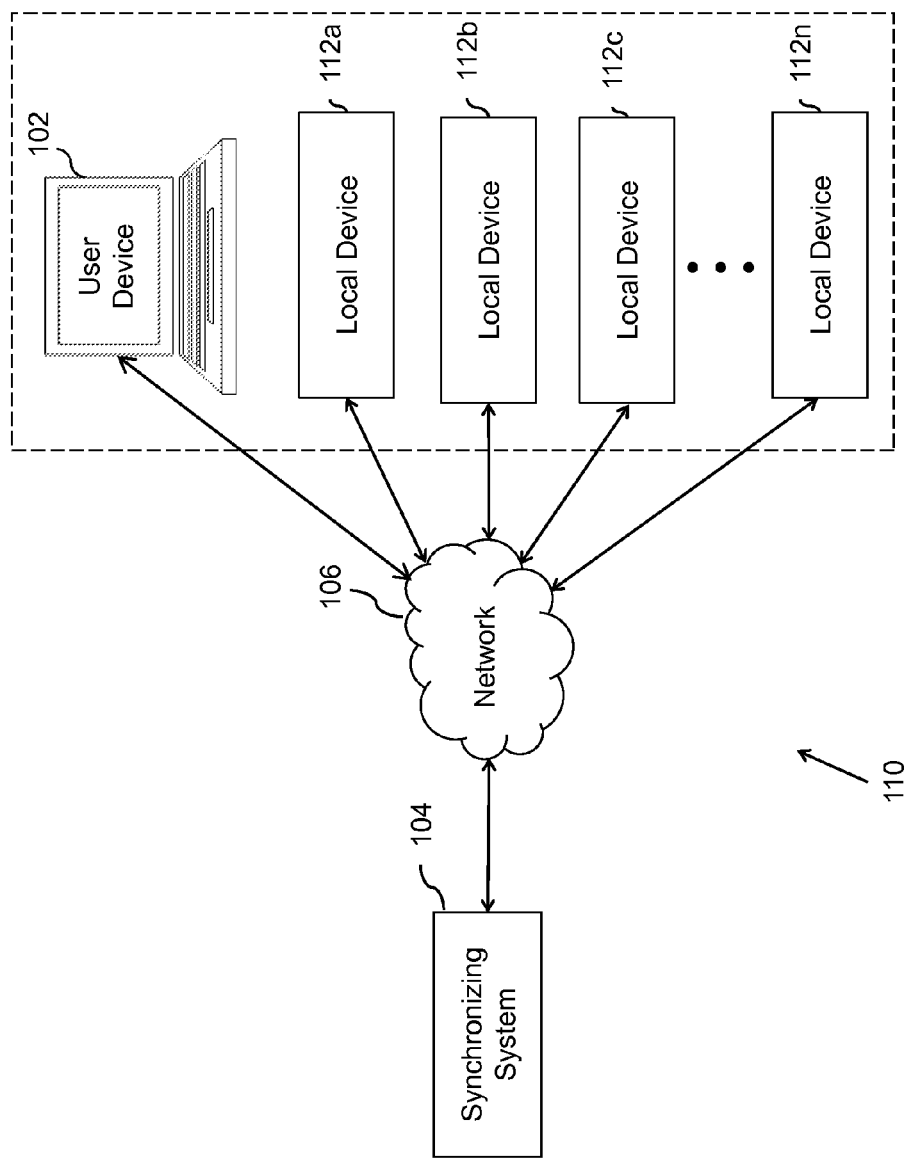
FIG. 1B is an exemplary network environment that supports communication between various electronic devices, such as the electronic device and the conferencing system, in accordance with another embodiment of the present invention.

FIG. 1B illustrates an exemplary network environment 110 to support communication between various electronic devices, such as the electronic device 102 and the conferencing system 104, in accordance with another embodiment of the present invention. Further, the environment 110 includes local devices 112a-n that are in communication with the electronic device 102 and with the conferencing system 104 via the network 106. In an embodiment, the user device 102 and the local devices 112a-n are geographically present at the same location. These devices might be present in a room, in a building, or in the same city area. In another embodiment, these devices might be connected with a local area network.

As shown, all of the devices including device 102 and 112a-n are individually connected with the network 106 to establish communication with the conferencing system 104. In an embodiment, the user of the user device 102 may be a group leader and a presenter/player of a video game that manages a virtual world of the game, and the users of the local devices 112a-n may be passive game watchers/learners/spectators. Here, the group leader, who may be a skilled game player, may play the game while other group members share his/her screen content and related audio. In an exemplary embodiment, the group members may also get information corresponding to substantially all inputs supplied by the group leader to perform an action in the video game (such as key strokes, mouse actions, or voice commands). Further, the conferencing system 104 may record the group leader's display screen along with the input patterns of the group leader and related audio. Therefore, the passive learners may have an option to access an action archive of the group leader, stored by the conferencing system 104, to re-view any action performed by the group leader to learn/understand how the group leader performed that action in the video game.

Figure 1C:
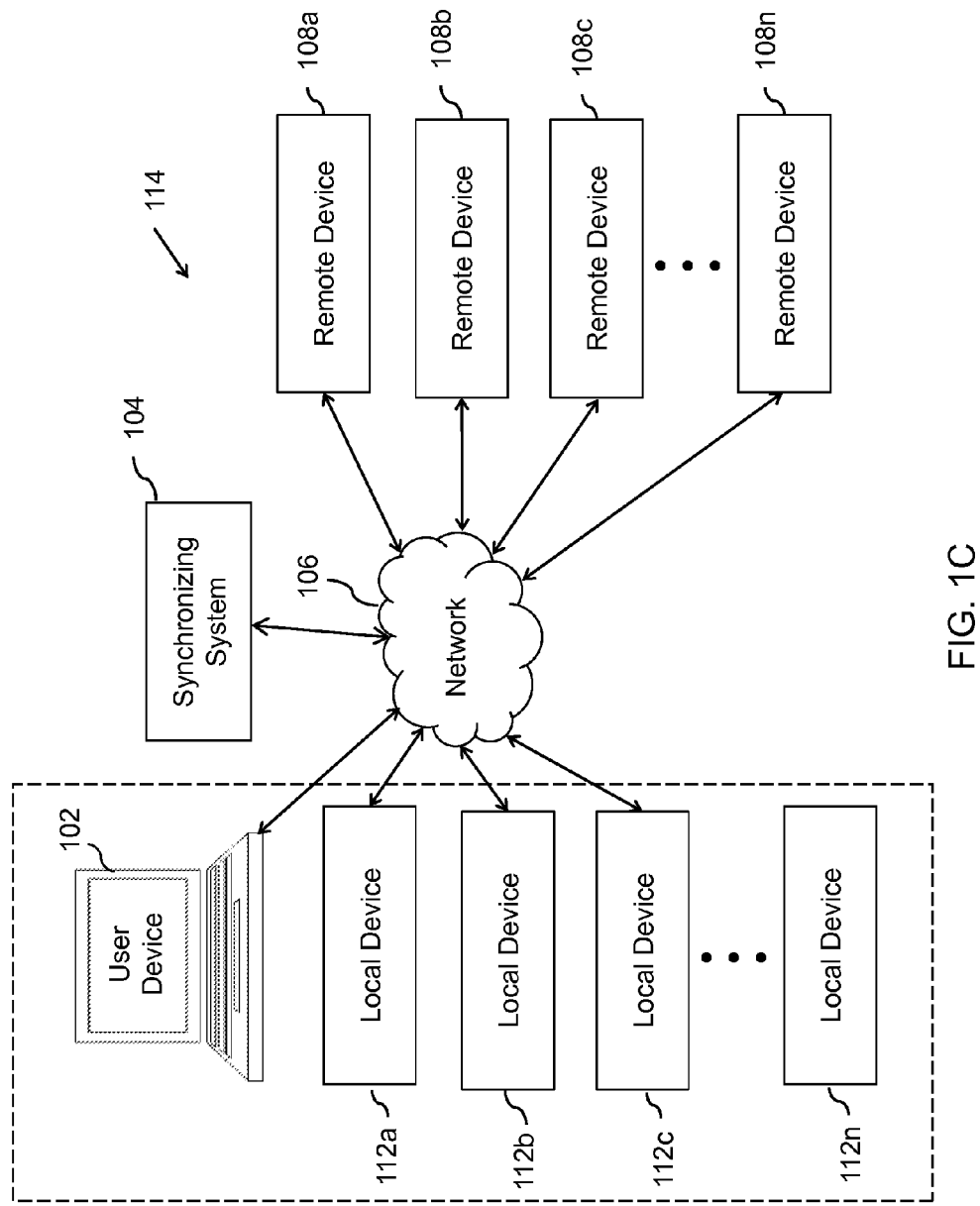
FIG. 1C is an exemplary network environment that supports communication between various electronic devices, such as the electronic device and the conferencing system, in accordance with yet another embodiment of the present invention.

FIG. 1C illustrates an exemplary network environment 114 to support communication between various electronic devices, such as the electronic device 102 and the conferencing system 104, in accordance with yet another embodiment of the present invention. As shown, the electronic device 102 and the local devices 112a-n are geographically present at a single location (as indicated by being enclosed within dotted lines) and are connected with the conferencing system 104. Similarly, the remote devices 108a-n are also connected with the conferencing system 104. As all the devices are connected with the conferencing system 104, the conferencing system 104 enables all the devices (hereinafter, may be referred to as "participants") to communicate with each other via an e-conference. In an exemplary embodiment, the e-conference may be a video conference.

Further, in the video conference every participant may view video of the speaker. Furthermore, if the speaker has some graphics to show to the participants then the speaker may either circulate a soft copy of the graphics to every participant, or may show a printed copy of the graphics at his/her device camera, or may simply click on an option provided by the conferencing system 104 to enable the participants to see his/her device's screen content instead of showing his/her own video. This may make it easier for the participants to view and acknowledge the relevant graphics. In addition, if any participant wants to ask a query about a portion of the displayed graphics or wants to embed additional graphics on or in the displayed graphics, then with the permission of the speaker the participant may broadcast his/her screen content to all the participants including the speaker, and the participants may see in real time the changes being made to the graphics. This may help all the participants to better understand the queries or suggestions more easily.

For example, a video conference may be initiated by the users M, N, O, and P, having user P as the speaker or group leader in the conference. User P may be an automobile designer and other users may be automobile engineers. User P may initially broadcast video from web-cam of his/her electronic device during his/her introductory speech. Thereafter, when the user P wants to show a design of an automobile to the other users, user P may request with a click of a button that the conferencing system 104 should broadcast live video of his/her display screen. Other user may then see the design of the automobile that is displayed on the electronic device of user P. Ordinarily, the group leader P navigates inside the virtual world and the people following or duplicating the group leader's view (i.e., M, N and O) are following along passively.

Further, suppose one of the users (e.g., M) has a query related to a small section of the automobile design, which may be best asked and understood while highlighting the small section of the design. After submitting a request to group leader P to present a display to the group, group leader P may temporarily grant the request to M and allow M's display and annotations to it to be broadcast to the conference. Alternatively, group leader P may pass group leader privileges to user M. If the privileges are passed, they may be passed temporarily (e.g., for a fixed duration, or until a specified event occurs, or until revoked by P, etc.), or may be passed until relinquished or further passed by user M.

Thereafter when user M has received group leader privileges, user M may highlight that portion in his/her display means and may broadcast live video of his/her display screen to let everyone else see the highlighted portion that is being referred. Furthermore, if another user, say user N wants to improve a design of some part of the automobile, then the user N may also request group leader privileges in order to present to the conference N's idea for the design at his/her electronic device and broadcast the same display content to everyone else. In some embodiments, M may have authority to sub-delegate group leader privileges, and in some embodiments the delegation of group leader privileges is provided by the original group leader P. In this manner, the video conference may become more productive with the help of the conferencing system 104.

In contrast with the known art, embodiments in accordance with the present invention provide a distinction between the presenter or group leader, and a view leader. For example, a user O may be following a user M as a view leader. When presenter P is presenting and the presentation is not static, M may have an opportunity to look around the virtual world, perhaps at another portion of an object being displayed in the virtual world. In this case, O may be seeing what M is viewing. M may not need specific presenter privileges from P in order to generate a view that is seen by another user.

Figure 2:
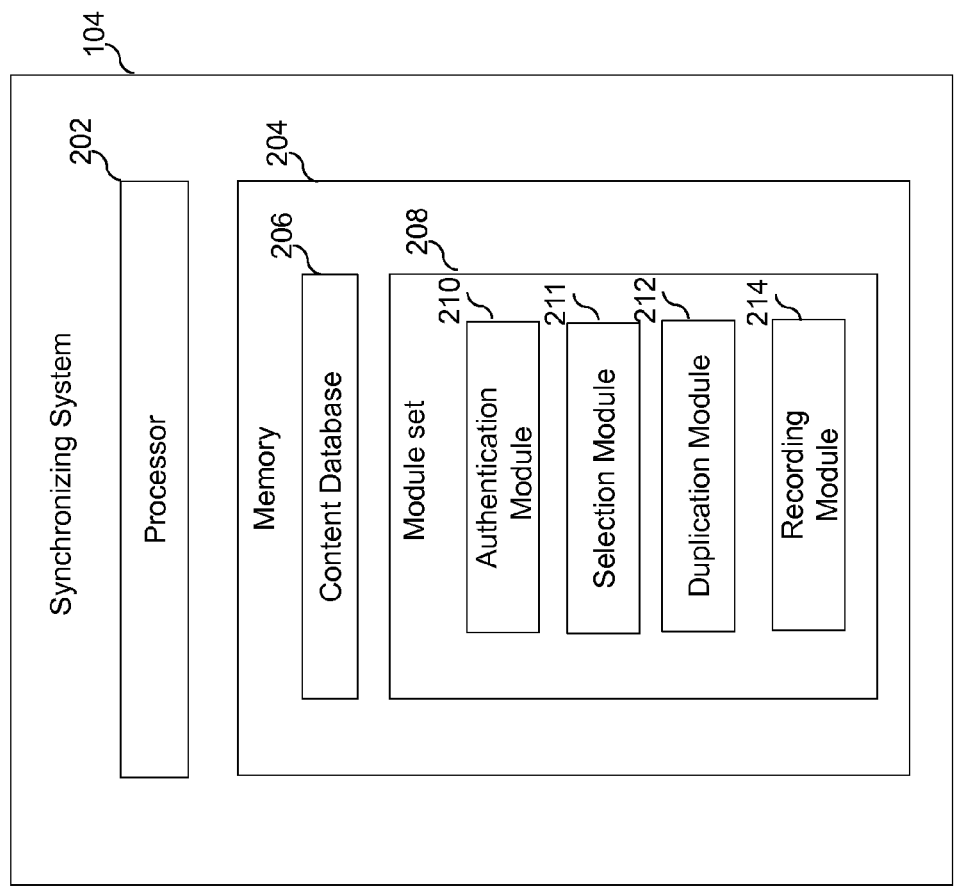
FIG. 2 is an exemplary block diagram of the conferencing system that provides a platform for various electronic devices to communicate with each other over a network, in accordance with an embodiment of the present invention.

FIG. 2 illustrates an exemplary block diagram of the conferencing system 104 for providing a platform to various electronic devices to communicate with each other over a network, in accordance with an embodiment of the present invention. The conferencing system 104 includes a processor 202 and a memory 204. The memory 204 further includes a content database 206 and an instruction module set 208. The content database 206 may include, but is not limited to, registration details of its registered users, details of the past communications between users (including both registered and unregistered users), archives of the screen contents of each registered user with its related audio and input sequences, and other necessary details corresponding to every e-conference held through the conferencing system 104.

Further, the module set 208 includes a number of dedicated modules, such as, but not restricted to, an authentication module 210, a selection module 211, a duplication module 212, and a recording module 214. It will be appreciated by a person skilled in the art that the aforementioned modules should not be considered as the limiting factors for the present invention. The aforementioned modules are selected to better explain the functioning of the present invention from a layman's perspective. The present invention can be implemented with any number of modules or with no modules at all.

The authentication module 210 may include instructions executable by the processor 202 to enable the registered users/participants to login/sign-in into the conferencing system 104 over a network, such as the network 106. The instructions executable by the processor 202 may analyze login credentials received from the user by matching the received credentials from the registration details that are stored in the content database 206 for the purpose of user authentication. If the credentials matched (e.g., user passed authentication check) with the registration details, the user will be allowed access to the services provided by the conferencing system 104. Further, the instructions executable by the processor 202 may allow the authenticated user to view if there are any e-conferences scheduled for the user or not. In case any e-conference is scheduled, the user may select to participate in the e-conference. Otherwise, the user may select to create/schedule/initiate a new e-conference by providing details such as, but not limited to, agenda of the e-conference, date and time for the e-conference, and list of invitees etc.

The selection module 211 is configured to let a participant select a leader among the plurality of participants. In an embodiment of the present invention, a leader may be a presenter, a manager of a participant, a colleague or a fellow participant. The selection module 211 is further also configured to let the plurality of participants to change their leader during the communication session.

The duplication module 212 may include instructions executable by the processor 202 to enable a participant of the e-conference to access live display content that is being displayed on electronic device of any user who is connected with the conferencing system 104. The duplication module 212 may also be referred to as synchronizing module as the duplication module 212 basically synchronize display screen contents of any electronic device with at least one another user's electronic device (i.e., at least two users may view same displayed content). In an embodiment, a user (e.g., a first user) can only have access to display content of another user (e.g., a second user), if the second user allowed the first user to view his/her display content.

Further, the duplication module 212 may also have instructions executable by the processor 202 to allow the first user to have access to any audio that is outputted/inputted by the second user. In some embodiments, the duplication may require authorization by the group leader. In addition, the duplication module 212 may include instructions executable by the processor 202 to enable any participant of the e-conference to broadcast data that is being displayed at his/her electronic device's display screen, to all other participants of same e-conference, or to selective participants of the e-conference. Moreover, other participants may have an option to accept to view the broadcasted data or to reject to view the broadcasted data.

Furthermore, the duplication module 212 may include instructions executable by the processor 202 to enable a user to partially share his/her display content with other participants of the e-conference. The partial sharing may include, but is not restricted to, a selective document/file/application, a selective portion of display screen etc. In addition, the duplication module 212 may allow the participants to view screen content of more than one user of the e-conference at a time. Moreover, the duplication module 212 may include instructions executable by the processor 202 to allow a participant to get back to the original screen content of his/her electronic device.

The recording module 214 may include instructions executable by the processor 202 to record screen contents of the devices of every participant of the e-conference. In addition, the recording module 214 records all the inputs that are provided by the participants into their corresponding machines. Further, the recording module 214 stores the recorded data in real time in the content database 206 as an archive. This enables all the participants to access the archive of other participants to view action history of the user, i.e., to view steps performed by the user at a specific e-conference event that may help the participants to learn or understand corresponding to the event. In other words, the action history helps the participants to understand how a context was achieved, e.g., by viewing the recent path in a virtual world or a history of selections in a conferencing system.

Figure 3:
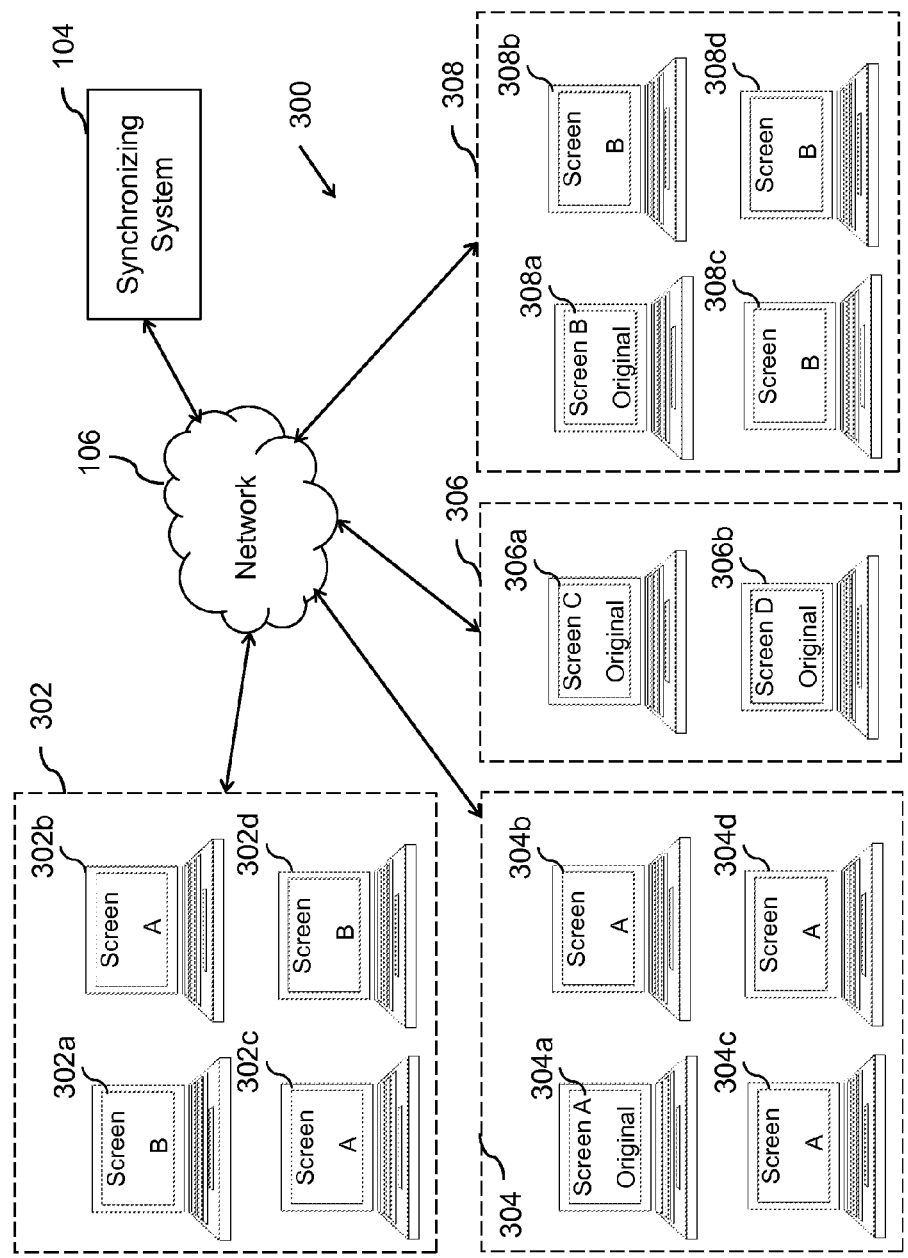
FIG. 3 is an exemplary environment where various embodiments of the present invention may be implemented.

FIG. 3 illustrates an exemplary environment 300 where various embodiments of the present invention may be implemented. Blocks 302, 304, 306, and 308 illustrate a respective group of electronic devices that are present at same geographical location or are part of same sub-network. As shown, every block has one or more electronic devices that are connected with the conferencing system 104 via the network 106.

Further, all the electronic devices are connected with the conferencing system 104 to participate into an e-conference. In an embodiment, the devices connected with the conferencing system 104 may participate in different conference systems. As shown, devices 304*a*, 308*a*, 306*a*, and 306*b* are the only devices those are not following any other device to view their display screen content, and are displaying original display content that is originating from their devices only. Moreover, there are other devices such as devices 304*b*-*c* and 308*b*-*c* that are following the devices 304*a* and 308*a* respectively to view their display screen content. However, there are no followers of devices 306*a* and 306*b*.

Furthermore, as shown in block 304, display content of the device 304*a* is original display content (e.g., audio and visual views) that is displayed by the device 304*a*. Moreover, the other devices in the block 304 are displaying duplicated display content of the device 304*a*. Similarly, there are devices in other blocks such as block 302 that are also displaying duplicated screen content of device 304*a*. In other words, the display content of devices 302*b*, 302*c*, 304*b*, 304*c*, and 304*d* is synchronized with the display content of device 304*a*.

Therefore, whatever data the user of the device 304*a* will view, the same data will be viewed by users of the other devices (e.g., devices 302*b*, 302*c*, 304*b*, 304*c*, and 304*d*) with the help of the conferencing system 104. In addition, devices 302*b*, 302*c*, 304*b*, 304*c*, and 304*d* will also be able to view details of inputs provided by the user of the device 304*a*, either historical or in real-time, with the help of the conferencing system 104. For example, if user of the device 304*a* clicked a left mouse button then a notification will be given to all the devices those are in sync with the device 304*a* in real time. Furthermore, devices 302*b*, 302*c*, 304*b*, 304*c*, and 304*d* also have access to view display content of the device 304*a* at any point of time in past, or at any past event. For example, devices 302*b*, 302*c*, 304*b*, 304*c*, and 304*d* can view display content of device 304a that was displayed at the device 304a for a predetermined period of time (e.g., two minutes) before the current time, or may view inputs given by the user of the device 304a at a predetermined point in a presentation (e.g., slide number four), and so forth.

Similarly, as shown, in block 308, display content of the device 308a is original display content that is originally displayed by the device 308a. However, the other devices in the block 308 are duplicating the display content of the device 308a. Moreover, there are devices in other blocks such as block 302 that are also displaying duplicated screen content of the device 308a. In other words, devices 302a, 302d, 308b, 308c, and 308d are in synchronization of display content with the device 308a. Therefore, whatever data user of the device 308a will view, same data will be viewed by users of the devices 302a, 302d, 308b, 308c, and 308d with the help of the conferencing system 104.

In addition, the devices 302a, 302d, 308b, 308c, and 308d may also be able to view details of inputs provided by the user of the device 308a, either historically or in real-time, with the help of the conferencing system 104. For example, if user of the device 308a presses some keys on his/her keyboard then a notification along with data typed by the user will be given to all the devices those are in sync with the device 308a in real time. Furthermore, devices 302a, 302d, 308b, 308c, and 308d also have access to view display content of the device 308a at any point of time in past, or at any past event. For example, devices 302a, 302d, 308b, 308c, and 308d can view display content of the device 308a that was displayed at the device 308a in some past e-conference, or can view inputs given by the user of the device 308a in that past e-conference.

Further, the devices 302a, 302d, 308b, 308c, and 308d are facilitated by the conferencing system 104 to switch back to their original device's display content at any period of time. In addition, the synchronization server also enables the devices 302a, 302d, 308b, 308c, and 308d to switch to some other device for synchronizing display content. For example, the device 302a that is in sync with the device 308a may switch to view display content of devices 304a-d or 306a or more at any time period. In an embodiment, the conferencing system 104 may enable all the devices to view display screen content or more than one electronic device.

Furthermore, the synchronization server may enable devices 304a and 308a, which are allowing other devices to view their screen content, to allow their followers to view only a specific part of their screen content, such as, a certain portion of display screen content, or displayed data of a specific file or application. For example, the user 304a may play a video and allow its followers to only view the video, while the user 304a is working on other files on his/her device.

Figure 4:
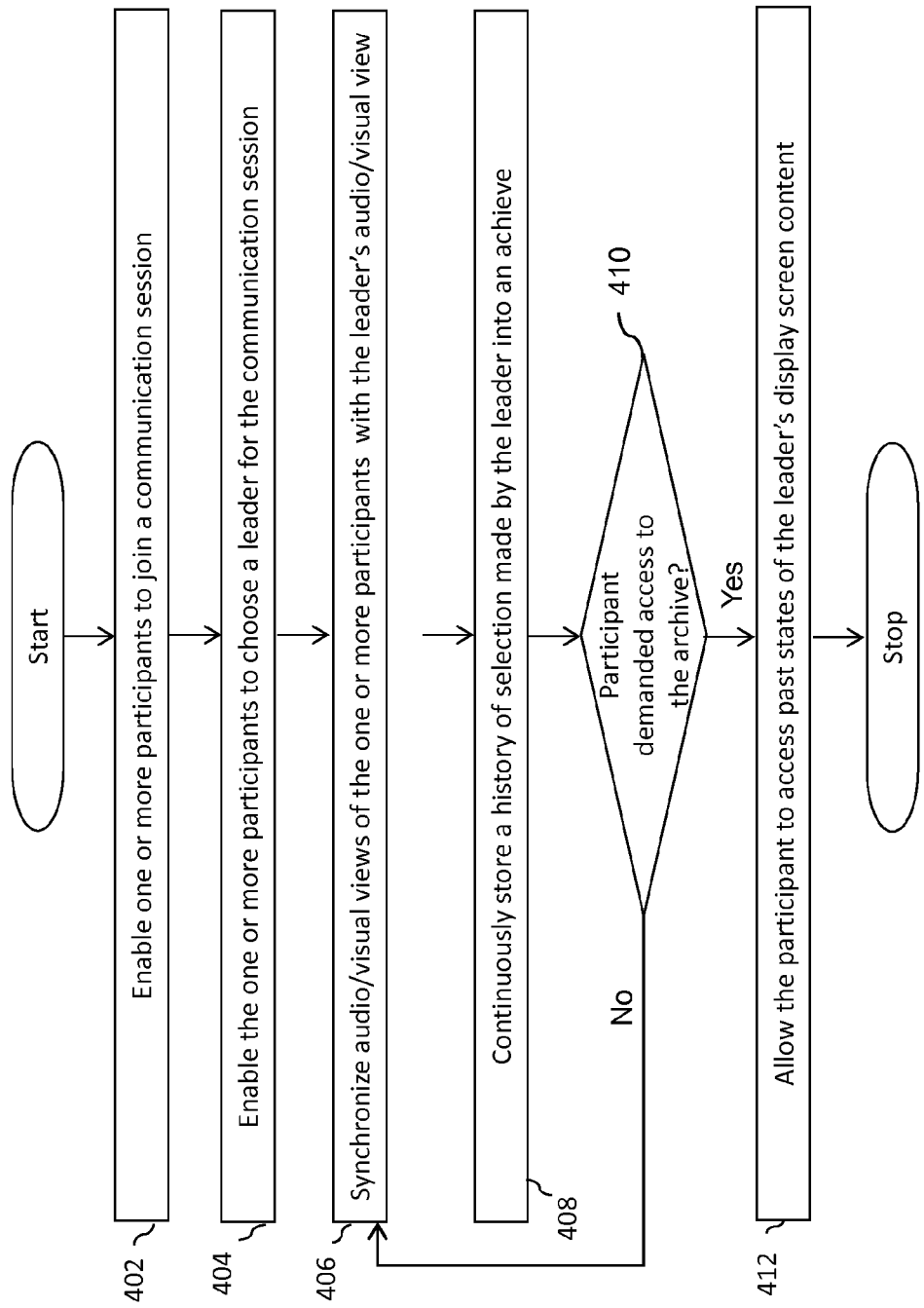
FIG. 4 is a flow diagram of a method for synchronizing display screen content of an electronic device with one or more other electronic devices, in accordance with an embodiment of the present invention.

FIG. 4 illustrates a flow diagram of a method 400 for synchronizing display screen content of an electronic device with one or more other electronic devices, in accordance with an embodiment of the present invention. The method may be understood more clearly when the description corresponding to the method, is read in conjunction with FIGS. 1 and 3 of the present invention. The order in which the method is performed is not intended to be construed as limitation, and further any number of the method steps may be combined in order to implement the method or an alternative method without departing from the scope of the present invention.

At step 402, a system such as the conferencing system 104, enables one or more authenticated users to join in an e-conference. The e-conference may be video conference, audio conference or any other type in which one or more users may communicate with each other over a network, such as network 106. Further, the conferencing system 104 allows the authenticated users to either join the e-conference as individual user or as a bunch of users representing a group, who may have an identity symbol for representation of group. Further, a group may represent logically connected participants of the e-conference that may share a common attribute or data. Furthermore, in case, if a user joined as an individual user, the user will be able to see the display content that will be originated from his/her own electronic device that is being used to connect with the conferencing system 104.

Further, suppose that a user joined as a part of a group. Then, at step 404, conferencing system 104 is enabled in order to allow a group leader of the group to be chosen. In an embodiment, the group leader may be determined by the group members. In an embodiment of the present invention, the group leader is a presenter or moderator of the presentation. In another embodiment of the present invention, the group leader is a participant of the presentation, other than the presenter. Further, a group may have more than one group leaders, which will divide a group in sub-groups having one group leader and its followers. In an embodiment, the conferencing system 104 may also allow the users those have joined the e-conference as individual user to become a part of any group at any point of time during the e-conference. In addition, all the group members of the groups are also enabled by the conferencing system 104 to leave their respective groups to become individual users or to switch to a new group. Further, any group member may be allowed to become group leader with/without permission of other group members/leader.

At step 406, the conferencing system 104 will start synchronizing display contents of the display screens of the group leaders with the display screens of its followers, so that all of the followers are able to see data that is being displayed on the display screen of their respective group leaders. In addition to the data that is being displayed on the display screen of the group leader, followers will also be able to listen what their group leader can listen from the speakers of his/her electronic device.

Further, if the group leader provides any inputs from his/her electronic device's input devices, such as, but not restricted to, mouse, keyboard, touchpad, mike, etc. then followers of the group leader may configurably be able to view/listen to the inputs. Whether certain inputs from the group leader are made available to one or more of the other participants may be controlled by a reconfigurable policy (e.g., a configuration setting or leader-controlled property of the conference, etc.). For example, certain types of inputs or inputs to certain application programs may be deemed private and not shared with the conference. For example, typed inputs and/or inputs to a word processing program (or a specific instance thereof) may be deemed to be private and not sharable, such as private notes regarding action items, notes to self, ideas for future investigation, and so forth. In an embodiment, the group leader may provide inputs specifically to communicate with his/her followers. In addition, the conferencing system 104 may provide the group leader certain tools with the help of which the group leader can communicate with his/her followers only. The tools may be used to highlight a specific portion of his display screen for his/her followers, or may add or delete some data from his/her display screen, or may perform other functions that can help in communication with the group members. In an embodiment, the conferencing system 104 may also provide some tools to the group members by which the group members can communicate with their respective group leaders.

At step 408, the conferencing system 104 stores display contents and related data (such as inputs or audio) of all the group leaders into an archive. In an embodiment, the conferencing system 104 may also store display content and related data of every electronic device that is member of the e-conference into the archive. The data that is stored in the archive may include, but is not restricted to, display data that is being displayed at the electronic device, audio that is being outputted from speakers of the electronic device, inputs that are provided by the user of the electronic device etc. Moreover, the data stored by the conferencing system 104 is continuous and in real time. The purpose of storing the data in archive is to enable a user to re-access the data that was displayed on an electronic device at a specific event or at specific time duration. Further, at step 410, the conferencing system 104 determines that if any of the participants of the e-conference has demanded access to archive of any other participant. In case, if any participant decided to access archive of any other participant then the method proceeds forward to step 412, otherwise, the method may start again from step 406.

Further, at step 412, the conferencing system 104 enables the group members who are in sync with their group leaders to access archives of their group leaders to check screen data of their respective group leader at a particular time period or at a particular event. In an embodiment, the conferencing system 104 may allow every participant of the e-conference to access archived data of any other participant. In yet another embodiment, the conferencing system 104 may allow the participants to access archived data of any user from past e-conferences. For example, if in a video conference, a presenter taught the participants/spectators of the video conference to perform a step, say step 'abc'. Thereafter, during the presentation, if any participant wants to re-learn how to perform the step 'abc', then the participant may access the archive of the presenter (e.g., of step 'abc') from the conferencing system 104 and may watch the step that the presenter taught at the beginning of the presentation.

The exemplary systems and methods of this present invention have been described in relation to a conferencing system. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communication devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A conferencing system, comprising:
   an authentication module configured to establish a communication session, the communication session having a plurality of participants;
   a selection module configured to let a participant select a leader among the plurality of participants; and
   a duplication module configured to provide audio and visual views of the communication session to the participant based upon audio and visual views of the communication session associated with the leader and at least one other participant of the plurality of the participants simultaneously.

2. The conferencing system of claim 1, wherein the authentication module is configured to check authenticity of the plurality of the participants based upon login information provided by the plurality of participants.

3. The conferencing system of claim 1, wherein the leader is a presenter of the communication session.

4. The conferencing system of claim 1, wherein the selection module is configured to let the plurality of participants to select their leader during the communication session.

5. The conferencing system of claim 4, wherein the duplication module is configured to provide audio and visual views of the communication session to the participant based upon audio and visual views of the communication session associated with the changed leader.

6. The conferencing system of claim 1, wherein the duplication module is configured to synchronize the audio and visual views of the communication session associated with the participant with the audio and visual views of the communication session associated with the chosen leader.

7. The conferencing system of claim 1, further comprising a recording module configured to continuously store a history of selections made by the leader in the conferencing system.

8. The conferencing system of claim 1, further comprising a recording module configured to continuously store a history of user actions performed by the leader in the conferencing system.

9. The conferencing system of claim 7, wherein the recording module is configured to let the participant view the history of selections made by the leader.

10. The conferencing system of claim 8, wherein the recording module is configured to let the participant view the history of user actions performed by the leader in the conferencing system.

11. The conferencing system of claim 7, wherein the recording module is configured to let the participant reach a present state of audio and visual views of the communication session associated with the leader.

12. A computer-implemented method for sharing audio and visual views in a communication session, comprising:
   establishing a communication session, the communication session having a plurality of participants;
   enabling a participant to select a leader among the plurality of participants; and
   providing audio and visual views of the communication session to the participant based upon audio and visual views of the communication session associated with the leader and at least one other participant of the plurality of the participants simultaneously.

13. The computer-implemented method of claim 12, wherein the establishing comprises checking authenticity of the plurality of participants based upon login information provided by the plurality of participants.

14. The computer-implemented method of claim 12, further comprising enabling the plurality of participants to change their leader during the communication session.

15. The computer-implemented method of claim 14, further comprising providing audio and visual views of the communication session to the participant based upon audio and visual views of the communication session associated with the changed leader.

16. The computer-implemented method of claim 12, wherein the providing comprises synchronizing the audio and visual views of the communication session associated with the participant with the audio and visual views of the communication session associated with the chosen leader.

17. The computer-implemented method of claim 12, further comprising continuously storing a history of selections made by the leader.

18. The computer-implemented method of claim 17, further comprising enabling the participant to view the history of selections made by the leader.

19. The computer-implemented method of claim 18, further comprising enabling the participant to reach a present state of audio and visual views of the communication session associated with the leader.

20. A non-transitory computer readable medium storing computer readable instructions when executed by a processor perform a method comprising:
- establishing a communication session, the communication session having a plurality of participants;
- enabling a participant to select a leader among the plurality of participants; and
- providing audio and visual views of the communication session to the participant based upon audio and visual views of the communication session associated with the leader and at least one other participant of the plurality of the participants simultaneously.

* * * * *